United States Patent [19]

Shimizu et al.

[11] Patent Number: 5,065,520

[45] Date of Patent: Nov. 19, 1991

[54] RETICULE DEVICE FOR A FIRE SIGHTING SCOPE

[75] Inventors: Fumio Shimizu, Minamiminowamura; Yasutoshi Nishikubo, Shiojiri; Tadaharu Naito, Suwa, all of Japan

[73] Assignee: Kabushiki Kaisha Light Kohki Seisakusho, Suwa, Japan

[21] Appl. No.: 545,924

[22] Filed: Jun. 28, 1990

[30] Foreign Application Priority Data

Jul. 31, 1989 [JP] Japan ............... 1-089246[U]

[51] Int. Cl.$^5$ ............................................. F41G 1/32
[52] U.S. Cl. ......................................... 33/241; 33/297
[58] Field of Search .................. 33/241, 245, 297, 298

[56] References Cited

U.S. PATENT DOCUMENTS

| | | | |
|---|---|---|---|
| 2,392,979 | 1/1946 | Douden | 33/241 |
| 2,909,838 | 10/1959 | Kollmorgen et al. | 33/241 |
| 3,320,671 | 5/1967 | Rickert et al. | 33/297 |
| 3,481,658 | 12/1969 | Dietrich et al. | 33/341 |
| 3,552,819 | 1/1971 | Mandler | 33/241 |
| 4,214,371 | 7/1980 | Bush | 33/241 |
| 4,554,744 | 11/1985 | Huckenbeck | 33/241 |
| 4,792,673 | 12/1988 | Blackler | 33/241 |

FOREIGN PATENT DOCUMENTS

| | | |
|---|---|---|
| 79216 | 5/1987 | Japan . |
| 113112 | 7/1988 | Japan . |
| 30521 | 2/1989 | Japan . |

Primary Examiner—Thomas B. Will
Attorney, Agent, or Firm—Dilworth & Barrese

[57] ABSTRACT

The present invention discloses a reticule device for a fire sighting scope. According to the reticule device of the present invention, it is possible to lighten brightly the entire surface of a scale facing an eyepiece by illuminating light thereto. A light source and a reflection frame are mounted at each prescribed position and further a conventional crossed scale is incorporated into the device as it stands. Furthermore, since a glass plate is not employed in the scale, dust etc. which might adhere on the scale can easily be cleaned or swept off.

8 Claims, 2 Drawing Sheets

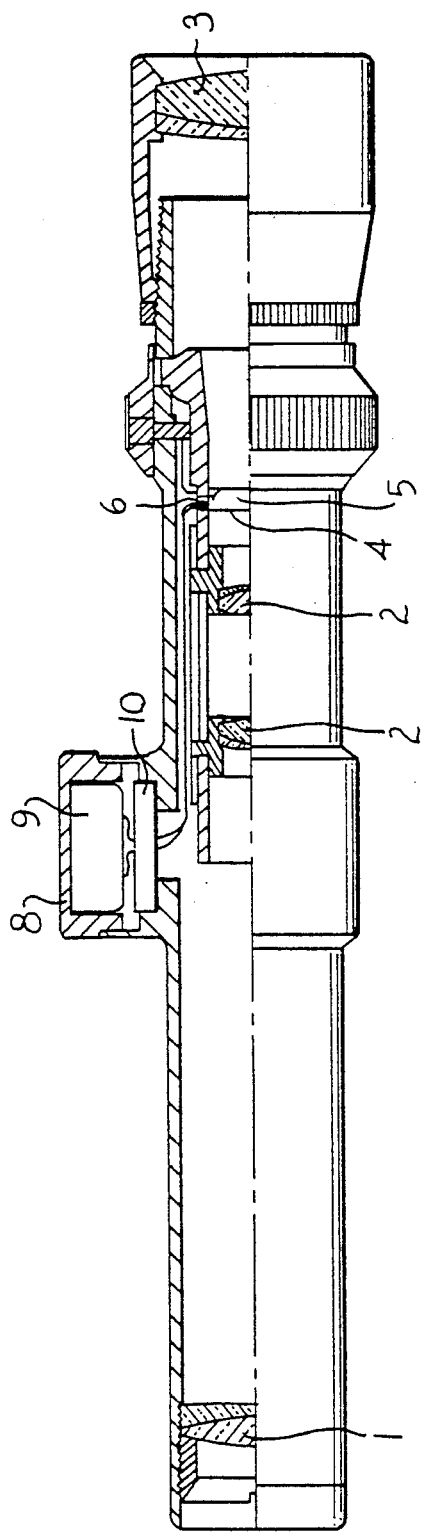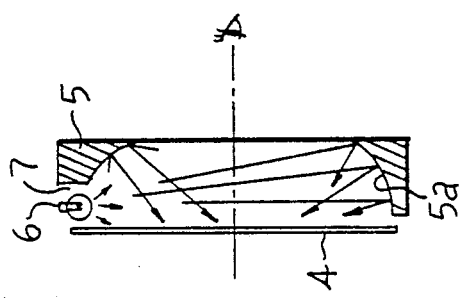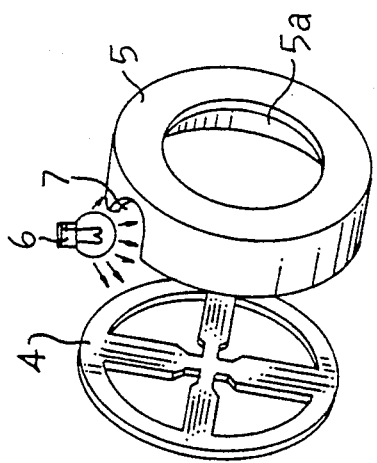

RETICULE DEVICE FOR A FIRE SIGHTING SCOPE

BACKGROUND OF THE INVENTION

The present invention relates to a reticule device for a fire sighting scope, and more particularly relates to a reticule device for a fire sighting scope wherein the sighting, consisting of a crossed scale and the like (hereinafter referred to as a "scale") indicated within a visual field of the scope is arranged to visually confirm with ease by utilizing an illumination mechanism.

Generally, in firing at game ( hereinafter referred to as a "target") such as a bird or an animal etc far away by means of a rifle, an object of a fire sighting scope is to facilitate the visibility of a target by providing an enlarged target image to a hunter and, at the same time, a scale as a standard for aiming at the target.

When the fire sighting scope, is employed under unfavorable condition such as during twilight, in a dark place, or in aiming at blackish or dark game etc, the scale is conventionally lightened so as to be easily seen by illuminating light thereon.

As a conventional reticule device disclosed, for example, in Japanese utility model laid-open publication No. 30521/1989, a reticule plate marking a scale onto the surface of a glass plate is formed. Further a multilayered film interference filter for reflecting or permeating the light having a prescribed wavelength component only is laminated onto the surface of said reticule plate so as to lighten the scale by illuminating light from an end surface of the glass of said reticule plate. (FIG. 4 therein). Furthermore, as disclosed in Japanese utility model laid-open publication No. 113112/1988, a scale is printed onto the inclined glass surface and the scale is lightened by illuminating light onto said scale (FIG. 5 therein). Still furthermore, as disclosed in Japanese utility model laid-open publication No. 79216/1987, a sighting pin in the shape of a rod is ground so as to constitute a scale and then the scale thus ground is lightened by illuminating light thereto. (FIG. 6 therein). Alternatively, as disclosed in Japanese utility model laid-open publication No. 11315/1985, optical fiber is utilized as one part of a scale and the scale is lightened by illuminating light onto an inclined tip portion of the optical fiber. (FIG. 7 therein).

In principle, high precision as to dimensional accuracy and finishing accuracy are essential for a scale. For this reason, various severe restrictions are imposed on the production technique and cost as well in the production of a scale.

However, all the aforementioned conventional reticule devices have such insufficiencies in points of facility and mass production of the same and further in an economical viewpoint because of a special construction applied to each scale thereof.

Furthermore, the aforementioned conventional reticule devices employ a glass plate and the like as a retaining or marking base material of the scale. Therefore, there are difficulties in cleaning or sweeping off dusts etc. adhered to the scale.

SUMMARY OF THE INVENTION

With the above in mind, an object of the present invention is to provide a reticule device for a fire sighting scope which can overcome conventional inconvenience.

The above object of the present invention can be achieved by providing a reticule device for a fire sighting scope according to the present invention comprising;

a light source being mounted in a vicinity of the peripherical edge of a scale, and a reflection frame formed in the shape of a ring being mounted at the side of the scale in a manner such that the light from the light source may illuminate the surface of the scale facing the side of an eyepiece by reflecting off a reflection surface of said reflection frame.

According to the reticule device of the present invention, a conventional crossed scale is incorporated into the device as it stands. Further, the light source and reflection frame are mounted at each prescribed position so as to lighten the facing surface wholly at the side of the scale by illuminating light thereto, and dust etc. adhering to the scale can easily be swept off because no glass plate is employed.

BRIEF DESCRIPTION OF THE DRAWINGS

In the Figures,

FIG. 1 is a partial sectional view of a fire sighting scope wherein the reticule device of the present invention is incorporated thereinto;

FIG. 2 is an exploded perspective view of the reticule device according to the present invention;

FIG. 3 is a longitudinal sectional view of the reticule device according to the present invention.

DESCRIPTION OF THE PREFERRED EMBODIMENTS

Figure 7:
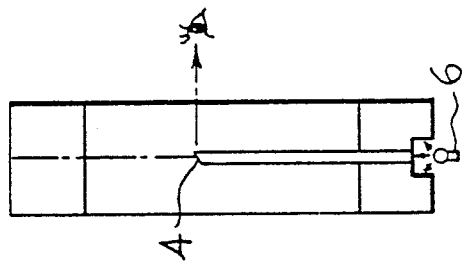
FIG. 4 to FIG. 7 are a longitudinal sectional view of a conventional reticule device.
Figure 6:
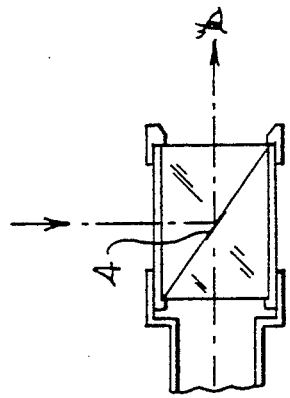
Figure 5:
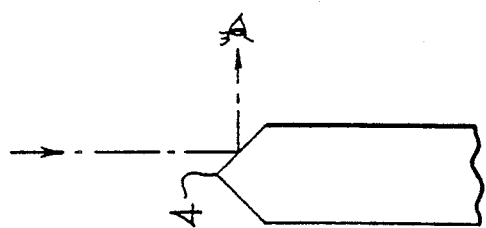
Figure 4:

In the Figures, reference numeral 1 denotes an objective lens, reference numerals 2 denotes an erect lens, reference numeral 3 denotes an eyepiece and reference numeral 4 denotes a scale. A reflection frame 5 in the shape of a ring is mounted a little to the right of scale 4. A light source 6 consisting of a single or a plurality of lamps is mounted in the vicinity of the peripherical edges of the scale 4 and the reflection frame 5.

One part of the light from the light source 6 illuminates directly a facing surface (hereinafter referred to as the "front") at the side of the eyepiece of the scale 4 and further the other part of the light illuminates the front of the scale 4 after reflecting off a reflection plane 5a of the reflection frame 5. Therefore, the entire scale can uniformly be brightened so as to obtain visibility with ease.

Thus, the visibility of the scale can easily be obtained through the eyepiece and a central opening portion of the reflection frame 5 ( the opening portion can be formed because of the reflection frame in the shape of a ring). By applying chrome plating etc to the reflection plane 5a in order to obtain mirror finishing, a reflection efficiency may be improved.

The curved configuration of the reflection plane 5a may suitably be selected under consideration of the relationship between the position of the light source, a clearance and the strength of light etc. As occasion demands, one portion of the reflection frame 5 may be notched so as to form a receiving portion 7 for receiving the light source thereinto, thereby constituting the device more compactly.

In the case of actual use of the reticule device according to the present invention, a switch 8 is merely pressed down with the finger tip etc so as to switch on the light source by contacting an electric power source 9 with a terminal 10. When use is finished, then the pressing force with the finger tip, etc. is released from the switch 8.

As mentioned above, according to the device of the present invention, the entire front of the scale can be brightened to obtain visibility with ease by merely pressing down the switch, even when the reticule device according to the present invention is used during twilight, in a dark place or in aiming at blackish or dark game.

Furthermore, a conventional crossed scale can be employed as it stands. Accordingly, the productivity in producing the device and the cost as well can be improved. Further it is easy to clean or sweep off dust etc which might adhere onto the scale of the reticule device of the present invention.

What is claimed is:

1. A reticle device for sighting scope, comprising
    a scale,
    a light source mounted in a vicinity of a peripheral edge of said scale, and
    a reflection frame formed in the shape of a ring and mounted with respect to said scale and light source such that light emanating from said light source illuminates a side of said scale facing an eyepiece by reflecting off a surface of said reflection frame,
    wherein said scale, light source, and reflection frame are mounted with respect to one another such that light emanating from said light source illuminates the side of said scale facing the eyepiece both directly and by reflecting off the frame surface.

2. The device of claim 1, wherein said scale is positioned without a glass plate.

3. The device of claim 2, wherein said scale is a crossed scale.

4. The device of claim 1, wherein said reflection frame is in the shape of a substantially continuous ring.

5. The device of claim 1, wherein said scale, light source, and reflection frame are positioned to illuminate the entire surface of said scale facing the eyepiece.

6. The device of claim 1, wherein said reflection frame comprises a curved configuration.

7. The device of claim 1, wherein said reflection frame comprises a notch formed to receive said light source,
    whereby said device is compactly arranged.

8. A reticle device for a sighting scope, comprising
    a scale,
    a light source mounted in a vicinity of a peripheral edge of said scale, and
    a reflection frame formed in the shape of a ring and mounted with respect to said scale and light source such that light emanating from said light source illuminates a side of said scale facing an eyepiece by reflecting off a surface of said reflection frame.
    wherein said reflection frame is mounted closest to the eyepiece, said scale is mounted furthest from said eyepiece, and said light source is positioned between said scale and reflection frame.

* * * * *